(No Model.)
J. P. SWAN.
PIPE HANGER.
No. 566,810.    Patented Sept. 1, 1896.
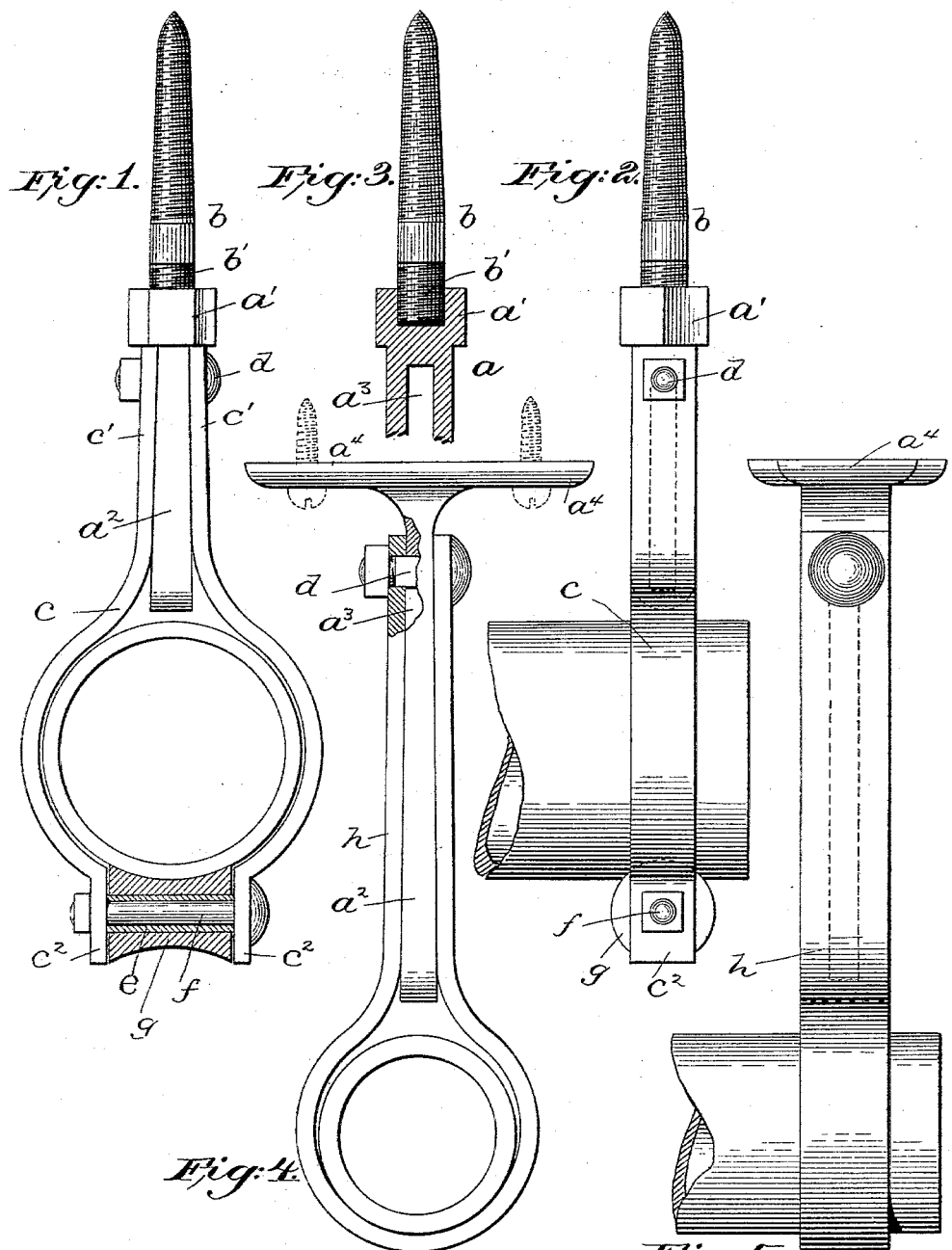

UNITED STATES PATENT OFFICE.

JOHN P. SWAN, OF BOSTON, MASSACHUSETTS.

PIPE-HANGER.

SPECIFICATION forming part of Letters Patent No. 566,810, dated September 1, 1896.

Application filed August 12, 1895. Serial No. 559,030. (No model.)

*To all whom it may concern:*

Be it known that I, JOHN P. SWAN, of Boston, in the county of Suffolk and State of Massachusetts, have invented certain new and useful Improvements in Pipe-Hangers, of which the following is a specification.

This invention has relation to pipe-hangers, and has for its objects the provision of a hanger which shall have but few parts, so as to be manufactured cheaply, and which shall be capable of such adjustment as to support a pipe at any height that may be desired.

To these ends my invention consists of a longitudinally-slotted supporting-bracket in the shape of an inverted wedge, a strap supporting the pipe, and a bolt passing through apertures in the ends of said strap and through the slot in the bracket, all as I will now proceed to describe with particularity, and point out in the appended claim.

Reference is to be had to the annexed drawings, and to the letters marked thereon, forming a part of this specification, the same letters designating the same parts or features, as the case may be, wherever they occur.

In the drawings, Figure 1 is a front elevation of one form of hanger in which my invention is embodied. Fig. 2 is a side elevation of the same. Fig. 3 shows in vertical section a portion of the supporting-bracket and its attaching-screw. Fig. 4 is a front elevation, partially in section, of another form of hanger in which my invention may be embodied, it being more especially adapted for smaller sizes of pipe. Fig. 5 is a side elevation of the hanger shown in Fig. 4.

In carrying out my invention I may employ several forms of hangers, but those which I have shown on the drawings, and which I shall now proceed to describe, are the best now known to me for the purposes for which they are intended. In suspending steam-pipes in an ordinary strap more or less trouble has been experienced owing to the expansion and contraction of the pipes, which tends to loosen the hangers or drag them out of line. In order to obviate this trouble, I employ a roller for directly supporting the pipe, so that the pipe may expand and contract relatively to the hanger without affecting the latter, this construction being shown in Figs. 1, 2, and 3; but with ordinary water or gas pipes there is practically no expansion or contraction, so that a roller is not needed, and a flat strap may be employed, as shown in Figs. 4 and 5. Referring, then, to Figs. 1, 2, and 3, $a$ designates a dependent bracket or support, preferably of cast metal, having an enlarged head $a'$, shaped so as to be grasped by a wrench or similar tool. The body $a^2$ of the bracket has two diverging sides, so as to be more or less wedge-shaped, and has an elongated through-slot $a^3$, which extends nearly its length. The head $a'$ has a threaded aperture adapted to receive the outer end $b'$ of a lag or similar screw $b$, by means of which the bracket may be secured to a joist or timber, or to any other part of the wall or ceiling from which the pipe is to be suspended or supported. After the screw $b$ has its end $b'$ screwed into the aperture in the head $a'$, the said head is grasped by a suitable tool and the screw is screwed into the support, or else the screw may first be driven in place and the head attached thereto afterward.

$c$ designates a strap which encircles the pipe to be supported, and which has two straight legs $c'$ $c'$, which lie on either of the diverging sides of the body portion of the bracket, and are clamped against them by means of a bolt $d$, which passes through holes in the ends of the strap and through the slot $a^3$ in the bracket. Preferably the bolt is square or polygonal in cross-section, with the exception of its threaded end, and the holes in the strap are also square or polygonal, so that when the strap is clamped in place it cannot swing or move and is practically rigid with the bracket. The strap is divided below the pipe, and its lower ends $c^2$ $c^2$ are bent downward to receive between them a bushing $e$. A bolt $f$ is inserted through holes in the ends $c^2$ $c^2$ and through the bushing, and a nut is screwed upon its end to bind the strap and the bushing firmly and rigidly together. A concaved roller $g$ is mounted upon the bushing so as to turn freely thereon and thereby permit the expansion and contraction of the pipe without the hanger being affected.

A hanger constructed in accordance with the above description possesses great strength and will support a heavy pipe of large size. By forming the body of the bracket in the shape of an inverted wedge I am enabled to clamp the strap at any point that may be desired, as the inclined sides prevent the latter from slipping down, as will be readily understood, even if the nut on the bolt should become loosened. The lag-screw may be detached from the bracket and a new one inserted, or a different kind of screw or bolt put in its place. By employing the bushing to connect the lower ends of the strap I am enabled to bind the said ends tightly together, and at the same time to journal a roller upon it to assist in placing a pipe in the strap or removing it therefrom, as well as to permit the expansion and contraction of the pipe, as has been explained.

In Figs. 4 and 5 the pipe-hanger illustrated therein differs slightly from the one above described, being especially adapted for use in connection with water and gas pipes. Instead of forming the bracket with an internally-threaded head adapted to receive a screw, I cast the bracket with a laterally-extending foot $a^4$, which may be attached in place by screws passing through apertures therein, as shown by dotted lines in Fig. 4. The body of the bracket is similar to that in Fig. 1 in that it is in the shape of an inverted wedge. The strap $h$ is formed of one integral piece, and has its legs clamped to the bracket similarly to the manner in which the strap is secured to the bracket in Figs. 1 and 2, so that when it is once secured in place by the bolt and nut it will not slip down, as previously described.

Having thus explained the nature of the invention and described a way of constructing and using the same, though without attempting to set forth all of the forms in which it may be made or all of the modes of its use, it is declared that what is claimed is—

A pipe-hanger, comprising in its construction a downwardly-projecting bracket in the shape of an inverted wedge, and having a longitudinal elongated through-slot, a strap encircling the pipe and having its ends extended to lie on the inclined sides of said bracket, and a bolt passing through apertures in the ends of said strap and through said slot, and a nut on the end of said bolt to clamp said strap adjustably on said bracket, substantially as set forth.

In testimony whereof I have signed my name to this specification, in the presence of two subscribing witnesses, this 20th day of June, A. D. 1895.

JOHN P. SWAN.

Witnesses:
 M. B. MAY,
 C. C. STECHER.